US011486115B2

(12) United States Patent
Krone et al.

(10) Patent No.: US 11,486,115 B2
(45) Date of Patent: Nov. 1, 2022

(54) REMOTE TRAINING SYSTEM AND METHOD (71) Applicant: Caterpillar Inc., Peoria, IL (US)

(72) Inventors: Bradley P. Krone, Dunlap, IL (US);
Joseph Faivre, Edelstein, IL (US);
Steven D. Ott, Washington, IL (US);
Michael W. Bridenbaugh, Sewickley, PA (US); Tony R. Metzger, Congerville, IL (US)

(73) Assignee: Caterpillar Inc., Peoria, IL (US)

( * ) Notice: Subject to any disclaimer, the term of this patent is extended or adjusted under 35 U.S.C. 154(b) by 394 days.

(21) Appl. No.: 16/790,503

(22) Filed: Feb. 13, 2020

(65) Prior Publication Data

US 2021/0254306 A1 Aug. 19, 2021

(51) Int. Cl.
*E02F 9/20* (2006.01)
*E02F 9/26* (2006.01)
*G05D 1/00* (2006.01)
*H04W 12/06* (2021.01)

(52) U.S. Cl.
CPC ............ *E02F 9/205* (2013.01); *E02F 9/2045* (2013.01); *E02F 9/262* (2013.01); *E02F 9/265* (2013.01); *G05D 1/0038* (2013.01); *H04W 12/06* (2013.01); *G05D 2201/0202* (2013.01)

(58) Field of Classification Search
CPC ......... E02F 9/205; E02F 9/2045; E02F 9/262; E02F 9/265; E02F 9/261; G05D 1/0038; G05D 2201/0202; H04W 12/06; H04W 12/08; G09B 5/065; G09B 9/00
USPC ........................................................ 701/50
See application file for complete search history.

(56) References Cited

U.S. PATENT DOCUMENTS

| 4,776,750 | A | 10/1988 | Griswold, Jr. et al. |
| 6,633,800 | B1 * | 10/2003 | Ward ................... G05D 1/0038 701/34.2 |
| 9,110,468 | B2 * | 8/2015 | Funke .................. G05D 1/0291 |
| 9,982,415 | B2 | 5/2018 | Yamada et al. |
| 2016/0104391 | A1 * | 4/2016 | Wieland ................ G09B 19/24 434/219 |
| 2019/0019429 | A1 * | 1/2019 | Palberg ................. E02F 9/264 |

* cited by examiner

*Primary Examiner* — Muhammad Shafi
(74) *Attorney, Agent, or Firm* — Bookoff McAndrews, PLLC (57) ABSTRACT In one aspect, a method for shared access of a machine for operator training, the machine including a traction device and an implement, includes receiving an authorization from an access device to share access to the machine, and entering a shared control state based on at least the authorization received from the access device. The method also includes receiving commands from a remote operation device during the shared control state and operating at least one of the traction device or the implement of the machine based on at least the commands from the remote operation device while an operator is present in the machine.

20 Claims, 4 Drawing Sheets

REMOTE TRAINING SYSTEM AND METHOD

TECHNICAL FIELD

The present disclosure relates generally training devices and methods, and more particularly, to training devices and methods for operator training for a machine.

BACKGROUND

Machines such as dozers, tractors, motor graders, and excavators, are versatile, but can be complex. These, and other mobile machines, include a plurality of control devices that allow an operator to direct the machine within a worksite and perform various tasks. Systems for controlling motion of the machine, and systems for controlling actions of one or more implements, may each involve multiple input devices. Often, multiple devices are manipulated simultaneously to perform a desired task. Novice operators may require many hours of practice and training before achieving proficiency. Even experienced operators can require additional training or practice before successfully learning a new task or technique. To facilitate real-time supervision and instruction of novice operators by more experienced operators or trainers, some machines include an operator station including a second seat for a trainer. However, the inclusion of an additional seat increases cost, uses valuable cab space, and requires on-site trainers. For these or other reasons, many machines do not include cab modifications for a trainer.

U.S. Pat. No. 6,633,800 to Ward et al. (the '800 patent) describes an exemplary machine having a remote control system. The control system disclosed in the '800 patent allows a tele-operator to control a mining vehicle from a remote location. The control system includes a vision system to provide a view of the environment of the mining vehicle, and a communication device for receiving audio from the environment, or engine noise audio. While the remote control system disclosed in the '800 patent may be useful in some circumstances, such as mining operations, it may be less useful for shared control of a machine, and may not be useful for training an operator. For example, the remote control system disclosed in the '800 patent may not facilitate shared operation of the machine for operator training. Additionally, the system disclosed in the '800 patent may lack adequate communication and supervision to facilitate instruction from an experienced operator.

The disclosed method and system may solve one or more of the problems set forth above and/or other problems in the art. The scope of the current disclosure, however, is defined by the attached claims, and not by the ability to solve any specific problem.

SUMMARY

In one aspect, a method for shared access of a machine for operator training, the machine including a traction device and an implement, may include receiving an authorization from an access device to share access to the machine and entering a shared control state based on at least the authorization received from the access device. The method may also include receiving commands from a remote operation device during the shared control state and operating at least one of the traction device or the implement of the machine based on at least the commands from the remote operation device while an operator is present in the machine.

In another aspect, a method for shared access of a machine including a traction device and an implement may include receiving a request from a remote system to supervise operation of the machine and providing image information to the remote system. The method may also include receiving operator commands from an operator input device in the machine and operating at least one of the traction device or the implement of the machine based on at least commands received from the operator input device while providing the image information to the remote system.

In yet another aspect, training system for shared control of a machine may include an operator input device configured to generate operator commands in response to inputs generated by an operator present in the machine and a communication device configured to receive commands from a remote operation device. The training system may also include a training control unit configured to receive the operator commands and the commands from the remote operation device and an access authorization device configured to cause the training control unit to activate a shared control state that grants control to the remote operation device for controlling one or more functions of the machine with the commands from the remote operation device while the operator is present in the machine.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value.

Figure 1:
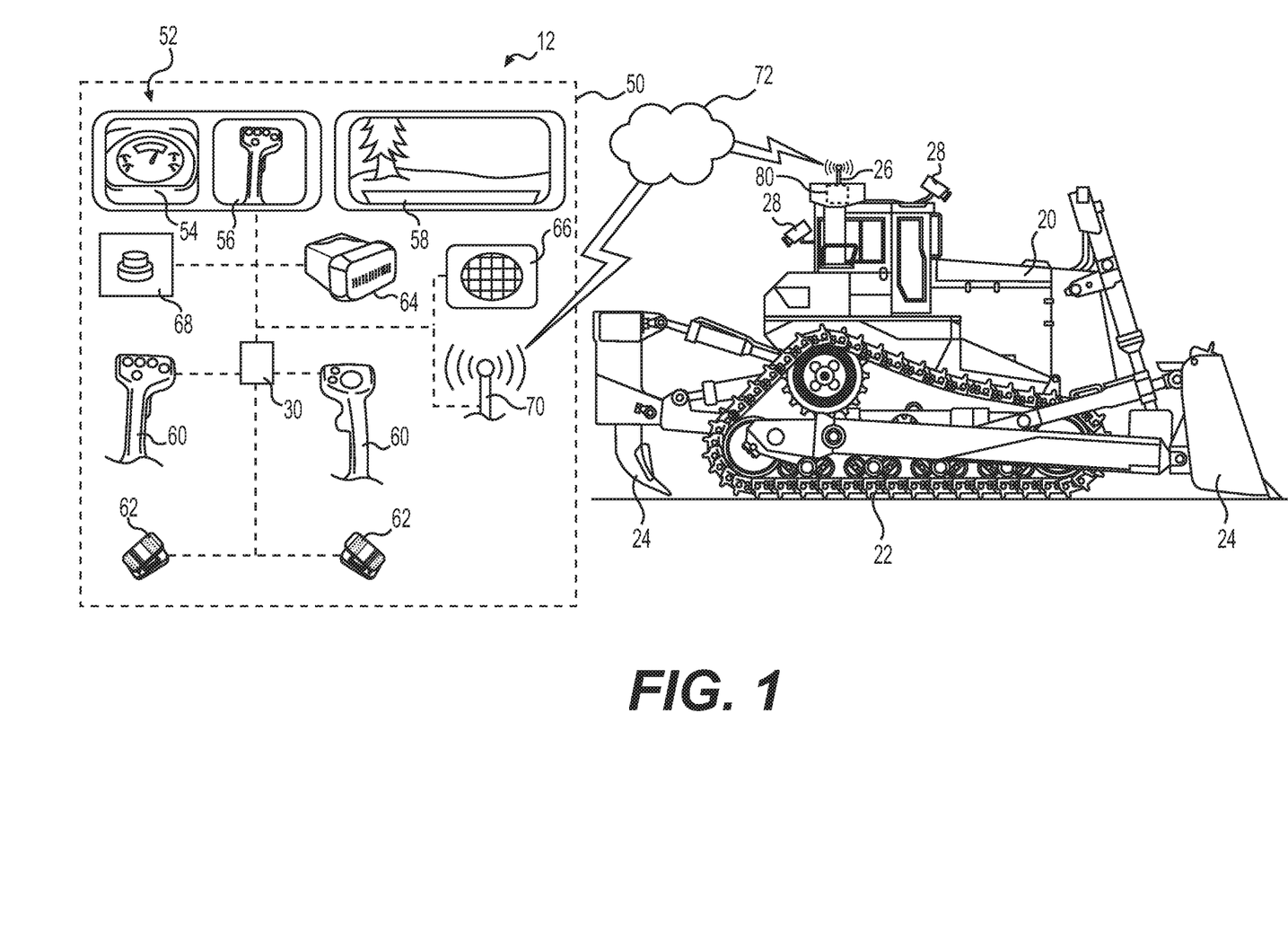
FIG. 1 is a diagram illustrating a machine training system according to an aspect of the present disclosure.

FIG. 1 illustrates a machine training system 12 for facilitating shared operation of a machine 20. While a dozer is shown in FIG. 1, machine 20 may be any appropriate machine, for example a tractor, motor grader, excavator, or any other machine. Training system 12 may include components of machine 20 and a remote operation device or remote system 50 for sharing control of machine 20. Remote system 50 may include or form a remote operation station, for use by an instructor, supervisor, or expert operator, and may include one or more devices to observe and/or share (e.g., override) control of machine 20 while an operator is present in machine 20.

Machine 20 may include one or more traction device 22 such as tracks or wheels, and one or more implements 24 for performing operations such as dozing, ripping, scraping, digging, etc. In an exemplary configuration, machine 20 may include a blade implement 24 and a ripper implement 24. One or more environment video cameras 28 may be provided to detect images (e.g., as real-time video) of an environment of machine 20 and/or an operation of an implement 24. In an exemplary configuration, one or more environment video cameras 28 may have a line of sight directed toward a front of machine 20 and toward a first implement 24 (e.g., a blade), while one or more environment video cameras 28 may have a line of sight directed toward a rear of machine 20 and a second implement 24 (e.g., a ripper). A communication device 26 may be configured for wireless communication with components of remote system 50 via a training system communication device 70 of remote system 50 and network 72. Communication device 26 may include a radio transmitter and receiver (e.g., a satellite or cellular transmitter and receiver), or any other suitable communication equipment. A training control unit 80 secured to or within machine 20 may be configured to facilitate control over traction device(s) 22 and/or implements 24 based on commands issued by an operator operating machine 20 and an instructor operating remote system 50.

Remote system 50 may include a training control system 30 in communication with a training system communication device 70 to facilitate observation and control of the operation of machine 20. Control system 30 may be any suitable control device, such as a computing system including one or more processors, memory, storage, etc., that controls components of remote system 50 to simulate or approximate an operator station 32 (FIG. 2) of machine 20. Remote system 50 may, via training control system 30, communicate with network 72, such as the internet, and may therefore be located at any suitable location with respect to machine 20 (e.g., tens, hundreds, or thousands of miles from machine 20).

Remote system 50 may also include display devices 52 (e.g., monitors) and input devices such as trainer joystick(s) 60, trainer pedal(s), 62, etc. Display devices 52 may be configured to provide images analogous to a view within operator station 32 (FIG. 2), while the input devices may be analogous to input devices present within the operator station 32. As such, any display or input device of machine 20 may be replicated by an analogous feature or device of remote system 50. Display devices 52 may include a replication display 54, an operator observation display 56, and/or an environment observation display 58. Replication display 54 may replicate or mirror (reproduce) a portion or an entirety of a display or physical indicators of machine 20, which may indicate a status of machine 20. Operator observation display 56 may show a real-time video of an operator operating one or more input devices of machine 20. Environment observation display 58 may display a view of a front and/or rear of machine 20, as well as an implement 24, work material, or obstacles in the vicinity of machine 20. One or more of displays 54, 56, and 58 may be provided on a separate display device. If desired, two, three, or more of the displays 54, 56, and 58 may be provided as a portion of a shared display device (see, e.g., displays 54 and 56 of FIG. 1). Remote system 50 may also include communication device(s) such as a trainer microphone 64 and trainer speaker 66.

Remote system 50 may further include one or more devices for requesting authorization for observing and/or sharing control of machine 20, such as an access request switch or access request device 68. While access request device 68 may be provided in the form of either a physical or electronic button (FIG. 1), access request device 68 may instead be provided as a physical or electronic switch, a plurality of buttons, or any other suitable form for receiving an input from a trainer or other user of remote system 50. As represented by dashed lines in FIG. 1, each of the displays 52, access request device 68, trainer microphone 64, speaker 66, trainer joysticks 60, trainer pedals 62, and training system communication device 70, may be in communication with training control system 30.

Figure 2:
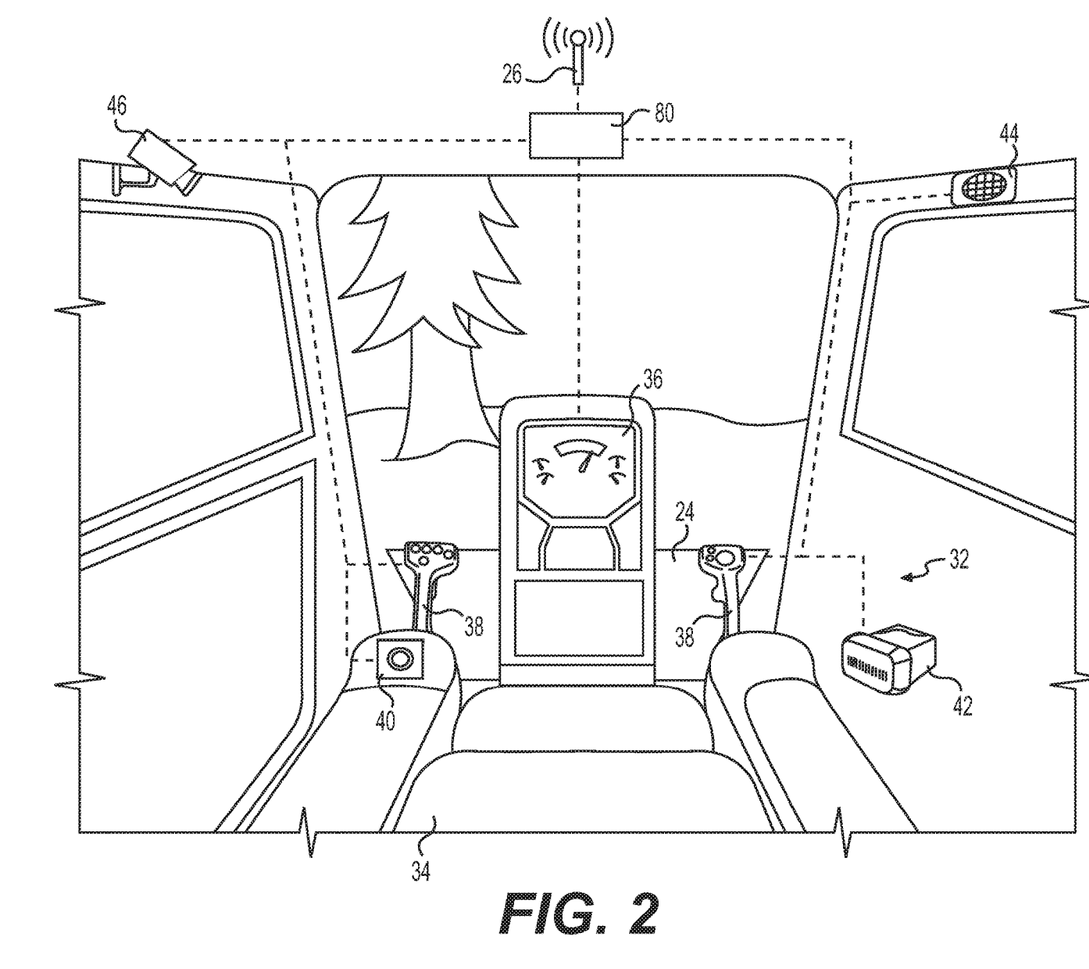
FIG. 2 is a partially-schematic interior view of an operator station including features of the machine training system of FIG. 1.

FIG. 2 is a view of an interior of machine 20, including an operator station 32. Operator station 32 may include one or more operator seats 34 from which an operator may observe one or more machine status indicators or displays 36 and access one or more input devices, such as machine joysticks 38 and one or more machine pedal(s) (not shown), to generate commands which control operation of the machine and which may be received by training control unit 80. Operator station 32 may further include an access authorization or assistance request device 40, and communication devices such an operator microphone 42 and a machine speaker 44. Observation devices such as an operator station video camera 46 may detect video (e.g., real-time video) of the operation of machine 20 via operator station 32. At least one operator station video camera 46 may be provided with a line of sight directed toward an input device within operator station 32, such as machine joystick(s) 38 and/or one or more pedals. Training control unit 80 may be in communication with machine display 36, machine joystick(s) 38, machine pedal(s) or other input devices, access authorization device 40, operator microphone 42, machine speaker 44, operator station video camera 46, and communication device 26.

In an exemplary configuration of machine 20, a plurality of input devices, including machine joysticks 38 and pedals, may be provided within operator station 32. A first machine joystick 38 may form an input device that allows an operator to control motion of machine 20 via traction device(s) 22. For example, a first (e.g., left) machine joystick 38 may facilitate movement, transmission state selection, and, if desired, steering operations, while a second (e.g., right) machine joystick 38 may control an implement (e.g., raising, lowering, or tilting a blade). Pedals within operator station 32 may allow an operator to control acceleration, braking, steering, etc., by controlling traction devices 22. Additional input devices (e.g., switches, buttons, knobs, etc.) may be provided within operator station 32 for controlling various functions of machine 20.

Training control unit 80 may be configured to control the operation of traction device 22 and implement(s) 24 of machine 20 based on inputs received from the input devices of machine 20 and inputs received from input devices of remote system 50. For example, training control unit 80 may be embodied by, or included in, an electronic control module of machine 20 that outputs control signals to one or more systems for controlling machine 20 (e.g., internal combustion engine systems, transmission systems, hydraulic systems for implements 24, etc.). In one aspect, training control unit 80 may operate in a plurality of modes or states during the control of machine 20, including a sole control mode or state and a training mode or shared control state. In the sole control state, training control unit 80 may prohibit control of machine 20 from remote system 50. In the shared control state, training control unit 80 may permit control of machine 20 from remote system 50, and may additionally permit control of machine 20 from operator station 32 (e.g., when no commands are issued from the input devices of remote system 50). Each of these modes or states may be selected or authorized via access authorization device 40. Access authorization device 40 may be a suitable physical or electronic (e.g., touch-screen element) button and/or switch that, when depressed or otherwise activated (e.g., switched to a first position), provides an access authorization to training control unit 80. The access authorization may cause training control unit 80 to enter the shared control state. When access authorization device 40 is subsequently depressed or otherwise activated (e.g., switched to a second position) the access authorization may be revoked, causing training control unit 80 to enter the sole control state and discontinuing the shared control state.

Figure 3:
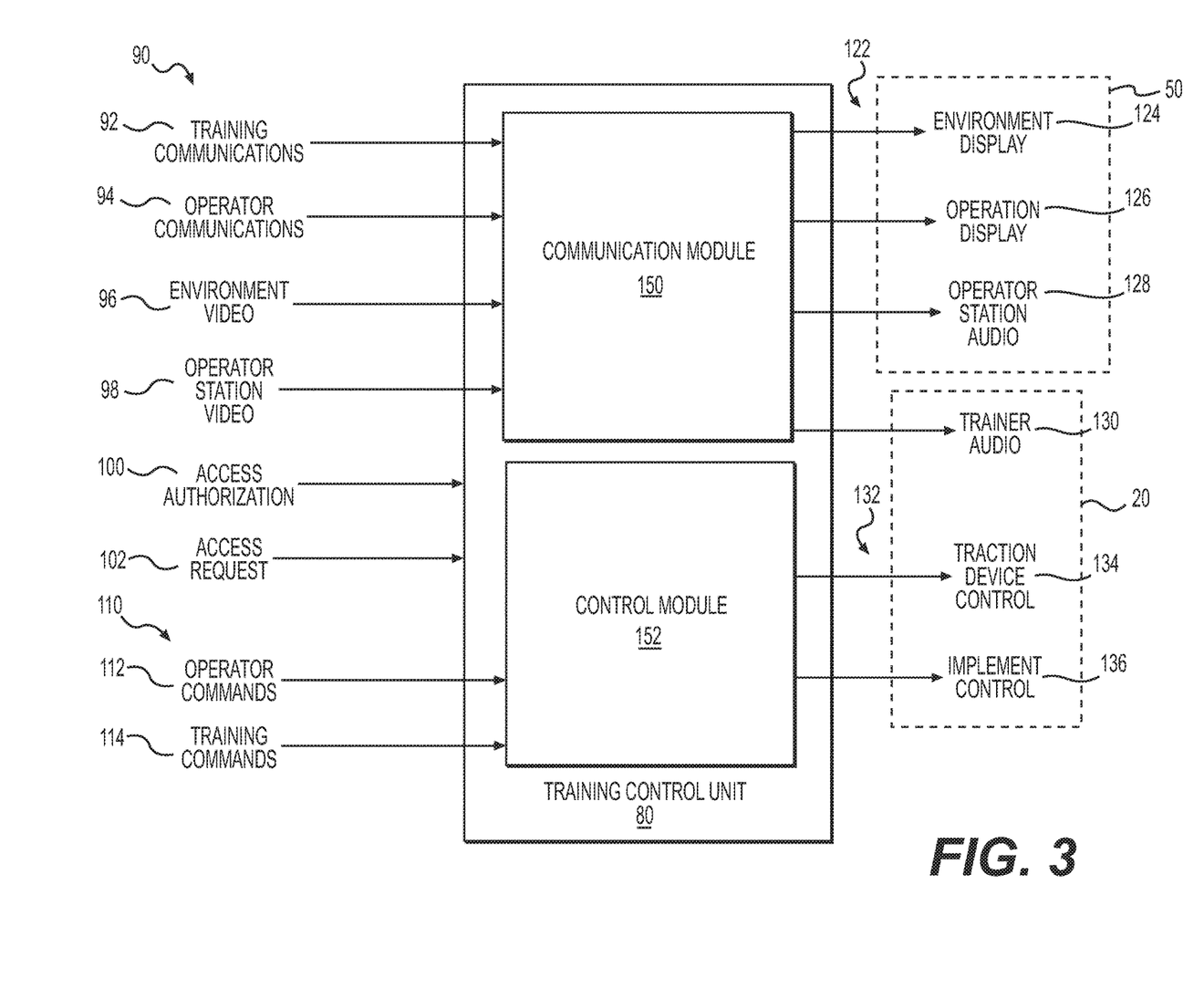
FIG. 3 is a block diagram illustrating an exemplary configuration of a training control unit of the machine training system of FIG. 1.

FIG. 3 is a block diagram illustrating an exemplary configuration of training control unit 80, which may include a communication module 150 to facilitate communication between a trainer and an operator, and a control module 152 to facilitate shared control of machine 20. Training control unit 80 may receive a plurality of inputs including communication inputs 90, control inputs 110, and authorization inputs such as access authorization 100 and access request 102. Training control unit 80 may provide communication outputs 122 and machine control outputs 132 (e.g., command signals for operating one or more of the traction device 22 and implement(s) 24).

Figure 4:
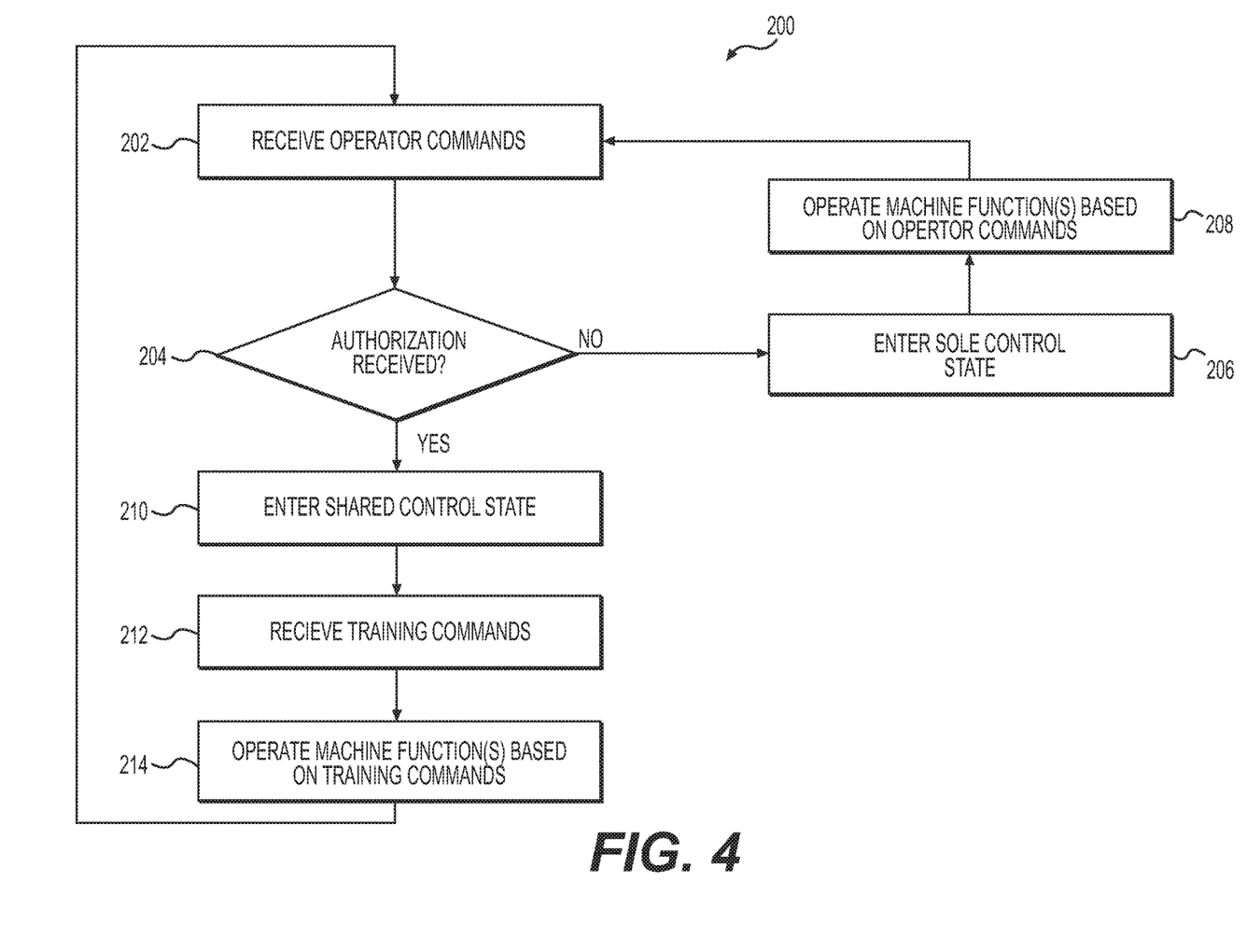
FIG. 4 is a flowchart illustrating an exemplary method according to an aspect of the present disclosure.

Training control unit 80 may include or embody a single microprocessor or multiple microprocessors that receive inputs (e.g., inputs 90) and issue control signals or other outputs (e.g., outputs 122, 132). Training control unit 80 may include a memory, a secondary storage device, a processor such as a central processing unit, or any other means for accomplishing a task consistent with the present disclosure. The memory or secondary storage device associated with training control unit 80 may store data and software to allow training control unit 80 to perform its functions, including each of the functions described with respect to method 200 (FIG. 4). In particular, such data and software in memory or secondary storage device(s) may allow training control unit 80 to perform the functions associated with communication module 150 and control module 152, as well as generating outputs 122 and 132 for controlling machine 20 and for facilitating supervision and communication between an operator of machine 20 (e.g., in operator station 32) and a trainer, supervisor, and/or expert operator present at remote system 50. Numerous commercially available microprocessors can be configured to perform the functions of training control unit 80. Various other known circuits may be associated with training control unit 80, including signal-conditioning circuitry, communication circuitry, and other appropriate circuitry. In some aspects, training control unit 80 may be separate from one or more control units of machine 20, and may act as a switch or filter for selectively prohibiting and enabling control signals for one or more machine control units.

Communication inputs 90 to training control unit 80 may be received by communication module 150 and may include training audio or training communications 92 from trainer microphone 64, operator audio or operator communications 94 from operator microphone 42, environment video 96 from front and/or rear environment video cameras 28, and operator station video 98 from operator station video camera 46. Based on these inputs, training control unit 80 may output audio and video information including one or more of an environment display 124, an operation display 126, operator station audio 128, and trainer audio 130. Environment display output 124 may correspond to images or video captured by environment video camera 28 and may be provided to a trainer as environment observation display 58 (FIG. 1). Environment display output 124 may provide visual information regarding the state (e.g., position, inclination, etc.) of an implement 24, as well as a view of any proximate obstacles or material located proximate to implement 24. This information may be provided in remote system by environment observation display 58. Operation display output 126 may correspond to images or video captured by operator station video camera 46 and may provide visual information of one or more input devices within operator station 32, such as machine joystick(s) 38. Thus, a trainer may be able to visually monitor an operator's use of the input devices of machine 20, including an input device for controlling an implement 24, via operator observation display 56. Operation display output 126 may also include operational information of machine 20 (e.g., engine speed, machine speed, fuel information, engine temperature, slope, or any other desirable information) that allows replication display 54 to replicate (reproduce) information that may be provided to the operator via machine display 36 (e.g., physical indicators of display 36, electronic images, or both). In order to facilitate training or supervision, displays 36 and 56 may provide information regarding the operation of machine 20 to both the operator and the trainer simultaneously or approximately simultaneously. Operator station audio 128 may correspond to audio captured with operator microphone 42 and may be output via trainer speaker 66. Trainer audio 130 may correspond to audio received via trainer microphone 64 and output with machine speaker 44.

Access authorization 100 and access request 102 may also be received by training control unit 80. Access authorization 100 may be issued by interacting with access authorization device 40 within operator station 32. In one aspect, interacting with access device 40 may generate a signal that is received by training control unit 80. This signal may be indicative of a command that training control unit 80 enter the sole control state or a command or authorization to enter the shared control state. The signal generated by interacting with access device 40 may also be indicative of a request to enter an observation-only state in which audio and video are shared by training control unit 80 and remote system 50 (e.g., by sharing audio and video via cameras 28 and 46, microphones 42 and 64, and speakers 44 and 66 via communication module 150), but control of machine 20 is not shared with remote system 50. When access authorization device 40 is implemented as a single button or similar device, a first activation (press) of this button may generate the command to enter the observation-only state, a second activation may generate the command to enter the shared control state, and a third activation may generate the command to enter the sole control state. If desired, access device 40 may include a plurality of buttons that respectively correspond to each state. When access device 40 is implemented as a switch, the switch may include three positions that respectively correspond to the sole control, observation-only, and shared control states.

Access request 102 may include a request initiated by interacting with access request device 68 of remote system 50. Access request 102 may be indicative of a request to supervise operation of machine 20 (e.g., by entering the observation-only state or the shared control state). For example, access request 102 may include a request to share control of machine 20 and a request to observe the operation of machine 20. Receipt of request 102 may cause training control unit 80 to present a notification to the operator, such as an audio notification and/or a visual notification to notify the operator of request 102. An operator may take a suitable action to authorize the observation-only state or shared control state of machine 20 in response to the receipt of access request 102. In one aspect, access request device 68 may include a plurality of buttons or a switch to request the observation-only state or the shared control state. If desired, training control unit 80 may be configured to enter the observation-only state in response to the receipt of request 102, or may instead be configured to enter the shared control state only when an access authorization 100 is received (either alone or in response to a request 102).

Control inputs 110 may be received by control module 152 from both remote system 50 and input devices within operator station 32. For example, control inputs 110 may include operator commands 112 that are issued by an operator by manipulating one or more of the machine joystick(s) 38, machine pedals, etc. Operator commands 112 may therefore include commands for causing machine 20 to move via traction device(s) 22 and/or commands for performing functions with implement(s) 24. Training commands 114 may similarly include commands for traction device(s) 22 and/or implement(s) 24, but are generated by training control system 30 and transmitted from remote system 50. In particular, training commands 114 may be provided to training control unit 80 in response to manipulation of trainer joystick(s) 60, trainer pedal(s) 62, or other input devices of remote system 50. Control module 152 may generate machine control outputs 132 (e.g., commands), including traction device control 134 commands and implement control 136 commands. Control module 152 may provide outputs 134 and 136 based on a current state or mode of training control unit 80 and based on whether commands 112 and 114 conflict with each other, as described below.

INDUSTRIAL APPLICABILITY

Machine training system 12 may be used in conjunction with any appropriate machine or vehicle. For example, machine training system 12 may be used with a dozer, tractor, motor grader, excavator, etc., to facilitate shared control of machine 20. Machine training system 12 may also facilitate communication between machine 20 (and an operator) and remote system 50 (and a trainer) over any suitable communication system or network 72. During the operation of machine 20, training control unit 80 may receive training commands 114 for operating machine 20 via communication device 26. Additionally, training control unit 80 may transmit video to remote system 50 and may provide two-way audio communication between operator station 32 and remote system 50 during the operation of machine 20. Training control unit 80 may operate according to a shared control state (or mode), or a sole control state (or mode), according to an operator's use of access authorization device 40.

FIG. 4 is a flowchart illustrating an exemplary process or method 200 performed with machine training system 12. In a step 202, control module 152 may receive operator commands 112 based on an operator's interaction with one or more input devices. These operator commands 112 may correspond to requested actions of traction device(s) 22, implement(s) 24, transmission components, accessories (e.g., wipers, lights, etc.), or any other component of machine 20. While steps 202 is shown as the first step of method 200, as understood, step 202 may be performed at various times (intermittently or continuously) throughout the operation of machine 20 and the performance of method 200.

In a step 204, training control unit 80 may determine whether an access authorization 100 has been received from operator station 32. In one aspect, access authorization 100 may be initiated by access authorization device 40 to generate a command that causes training control unit 80 to enter the training or shared control state. This access authorization 100 may be generated when an operator interacts with authorization device 40 within operator station 32. In some aspects, a trainer may initiate an access request 102 by interacting with access request device 68. This request may represent a request from remote station 50 to control machine 20 and/or a request from remote station 50 for the ability to override commands 112. Step 204 may include determining whether an authorization 100, generated from operator station 32, has been received in response to such a request 102.

When no access authorization 100 has been received (or when access is revoked via access authorization device 40), method 200 may proceed to step 206, in which training control unit 80 enters or remains in the sole control state. In step 208, machine 20 is operated according to this sole control state. When in the sole control state, training control unit 80 may operate machine 20 based solely or entirely on operator commands 112. During operation in the sole control state, training commands 114 issued via remote system 50 may be prohibited from affecting the operation of machine 20. Thus, during the sole control state, when operator commands 112 and training commands 114 conflict with each other, training control unit 80 may operate machine 20 based entirely on operator commands 112. Thus, training control unit 80 may prohibit control of machine 20 by the remote operation device or system 50. Optionally, audio and/or video communication between machine 20 and remote system 50 may also be blocked or prohibited while in this state. However, if desired, audio and/or video communications may be enabled between remote system 50 and machine 20 during the sole control state. This may be performed, e.g., by interacting with a second access authorization device 40 (e.g., a second button), by interacting with an access authorization device 40 in the form of a switch, or by interacting with any other suitable access device.

When the determination in step 204 is affirmative, an access authorization 100 has been received when an operator interacts with authorization device 40, either alone or in response to an access request 102 generated by a trainer interacting with access request device 68. In a step 210, in response to the receipt of access authorization 100, training control unit 80 may enter the training or shared control state. When in the shared control state, two-way communication between operator station 32 and remote system 50 may be enabled via communication module 150. For example, microphones 42, 64, and speakers 44, 66 may enable audio communication (e.g., operator station audio 128 and trainer audio 130), allowing a trainer to provide training to the operator, hear and answer questions from the operator, and explain functions of machine 20 to the operator. At the same time, cameras 28 and 46 may provide real-time video to the trainer, via display devices 52. Additionally, operation display output 126 may provide a real-time indication of the operating conditions of machine 20. Thus, training control unit 80 may allow a trainer using remote system 50 to observe the machine, the environment, the state of the machine, and/or the operator, in real-time.

In step 212, training commands 114 may be received by control module 152. For example, the trainer may interact with one or more input devices of remote system 50, generating training commands 114 that are received by training control unit 80 via network 72. Training commands 114, like operator commands 112, may request an action of traction device(s) 22, implements(s) 24, or any other component of machine 20. In one aspect, training commands 114 may be issued so as to override a conflicting operator command 112 (e.g., to demonstrate correct technique, or correct erroneous or inefficient commands issued from an operator), or may be issued in the absence of an operator command 112 (e.g., to demonstrate a particular action or function).

In step 214, training control unit 80 may cause one or more traction devices 22 or implements 24 to perform function(s) according to commands received in step 212. Step 214 may also include operating machine 20 based on operator commands 112 (e.g., in the absence of training commands 114 or in response to a determination that the input devices of remote system 50 are in neutral positions). Thus, the trainer may be able to observe and supervise the operation of machine 20. During the operation of machine 20 in step 214, the operator and trainer may generate operator commands 112 and training commands 114 at the same time or during an overlapping period of time. In at least some circumstances, these commands 112 and 114 may conflict with each other. As understood, "conflicting" commands include any differing commands for operating traction device(s) 22 and/or implement(s) 24, and is not limited to opposite commands.

In one aspect, the trainer may input commands to correct an action of the operator. For example, operator commands 112 may request a particular function of implement 22, such as lowering a blade, while training commands 114 may request a conflicting function of implement 22, such as raising or tilting the blade. In response to the receipt of conflicting commands 112 and 114, training control unit 80 may determine whether commands 112 are related to a safety function (e.g., deceleration) or a safety device (e.g., a park brake). When commands 112 are not related to a safety function or a safety device, training control unit 80 may override operator commands 112 with training commands 114, facilitating correction by the trainer. In one aspect, implement manipulation commands received from remote system 50 may override implement manipulation commands from operator station 32 during the shared control state. Conversely, when operator commands 112 are directed to a safety function or a safety device, training commands 114 may be overridden by operator commands 112. For example, operator commands 112 for decelerating or engaging a park brake may override training commands 114 for accelerating. Thus, machine control unit 80 may be configured to prioritize commands from remote system 50 based on a type of action (e.g., safety) requested by the commands from the input devices of machine 20. Additionally or alternatively, command prioritization may be based on types of action such as implement commands, traction device commands, or any other type of action. In one example, all braking and deceleration commands to decelerate or stop machine 20 may be given priority over commands to accelerate machine 20 or operate machine 20 at a constant speed. In another example, commands for locking out an implement 24, which may be generated by a lockout switch located in operator station 32, may be prioritized over commands for moving or otherwise manipulating implement 24. In yet another example, commands associated with machine joysticks 38, such as commands manipulating implement 24 (e.g., raising or lower a blade) and steering commands, may be prioritized over corresponding commands from remote system 50.

Machine training system 12 may facilitate remote observation and/or demonstration of machine 20 by a trainer while an operator is present within an operator station 32 of the machine. System 12 may facilitate operator training or instruction, especially for machines 20 that do not include accommodations for a trainer, such as a so-called "buddy seat." System 20 may allow a trainer or supervisor to interact, observe, and/or override an operators controls (which may be input manually by an operator present in operator station 32). System 20 may allow the operator to operate the machine 20 in real-time while an instructor observes and, if necessary, overrides one or more commands input by the operator, allowing an instructor to correct or demonstrate operation of machine 20. This may improve operator safety and training efficiency. Additionally, system 20 may allow a trainer to instruct or otherwise verbally communicate with the operator (e.g., via the two-way communication system), observe the operator's performance (e.g., via camera 46), observe worksite conditions (e.g., via cameras 28), and troubleshoot machine 20 and/or worksite issues. Moreover, system 12 may be configured to receive control commands from both a remote system 50 and an operator. System 12 may prioritize safety-related controls initiated by the operator, such as a park brake, over commands from remote system 50, allowing the operator to retain full control over safety-related operations of the machine 20.

It will be apparent to those skilled in the art that various modifications and variations can be made to the disclosed method and system without departing from the scope of the disclosure. Other embodiments of the method and system will be apparent to those skilled in the art from consideration of the specification and practice of the method and system disclosed herein. It is intended that the specification and examples be considered as exemplary only, with a true scope of the disclosure being indicated by the following claims and their equivalents.

What is claimed is:

1. A method for shared access of a machine for operator training, the machine including a traction device and an implement, the method comprising:
   receiving an authorization from an access device to share access to the machine;
   entering a shared control state based on at least the authorization received from the access device;
   receiving commands from a remote operation device during the shared control state; and
   operating at least one of the traction device or the implement of the machine based on at least the commands from the remote operation device while an operator is present in the machine.

2. The method of claim 1, further including receiving a request from the remote operation device for supervision of operation of the machine.

3. The method of claim 2, further including transmitting information to the remote operation device to cause the remote operation device to mirror a display of the machine in response to the authorization.

4. The method of claim 1, wherein the access device is disposed within an operator station of the machine.

5. The method of claim 1, further including:
receiving a request from the access device to discontinue sharing control of the machine;
discontinuing the shared control state; and
controlling at least one of the traction device or the implement of the machine with only operator commands after discontinuing the shared control state.

6. The method of claim 5, further including prohibiting control of the machine by the remote operation device in response to receiving the request from the access device to discontinue sharing control.

7. The method of claim 1, further including:
receiving operator commands from an operator input device in the machine; and
prioritizing the operator commands over commands from the remote operation device when the operator commands include a command for engaging a park brake during the shared control state.

8. The method of claim 1, further including:
receiving operator commands from an operator input device in the machine; and
prioritizing the commands from the remote operation device, when the operator commands and the commands from the remote operation device are commands for operating the implement and are in conflict during the shared control state.

9. A method for shared access of a machine including a traction device and an implement, the method comprising:
receiving a request from a remote system to supervise operation of the machine;
providing image information to the remote system;
receiving operator commands from an operator input device in the machine;
operating at least one of the traction device or the implement of the machine based on at least the operator commands received from the operator input device while providing the image information to the remote system; and
discontinuing providing the image information to the remote system in response to a request to discontinue the supervision of the operation of the machine.

10. The method of claim 9, further including establishing an audio connection between an operator station of the machine and the remote system.

11. The method of claim 9, wherein the image information includes at least images of an environment of the machine and images that correspond to a status of the machine.

12. The method of claim 9, wherein the image information includes at least images of one or more input devices within of the machine.

13. The method of claim 12, wherein the images of the one or more input devices of the machine include the operator input device.

14. The method of claim 9, wherein the request to supervise operation of the machine includes a request to share control of the machine.

15. The method of claim 9, further including:
entering a shared control state;
simultaneously receiving commands from the remote system and the operator commands; and
prioritizing the commands from the remote system or the operator commands based on a type of action requested by commands from one or more input devices of the machine.

16. The method of claim 15, wherein the commands from the one or more input devices of the machine include the operator commands.

17. A training system for shared control of a machine, the training system comprising:
an operator input device configured to generate operator commands in response to inputs generated by an operator present in the machine;
a communication device configured to receive commands from a remote operation device;
a training control unit configured to receive the operator commands and the commands from the remote operation device; and
an access authorization device configured to cause the training control unit to activate a shared control state that grants control to the remote operation device for controlling one or more functions of the machine with the commands from the remote operation device while the operator is present in the machine,
wherein the access authorization device is configured to cause the training control unit to activate a second state which prohibits the remote operation device from controlling the one or more functions.

18. The training system of claim 17, wherein the communication device is configured to transmit video to the remote operation device, the video including video of the operator input device.

19. The training system of claim 17, wherein the training control unit is configured to prohibit control of the machine by the remote operation device except in response to an authorization generated by the access authorization device to share operation of the machine.

20. The training system of claim 17, wherein the one or more functions include manipulating an implement of the machine.

* * * * *